Sept. 26, 1967  R. R. McNAMARA  3,343,887
COMBINATION GRAVITY AND PNEUMATIC HOPPER OUTLET
CONSTRUCTION FOR RAILWAY CARS AND THE LIKE
Filed March 2, 1966  2 Sheets-Sheet 1
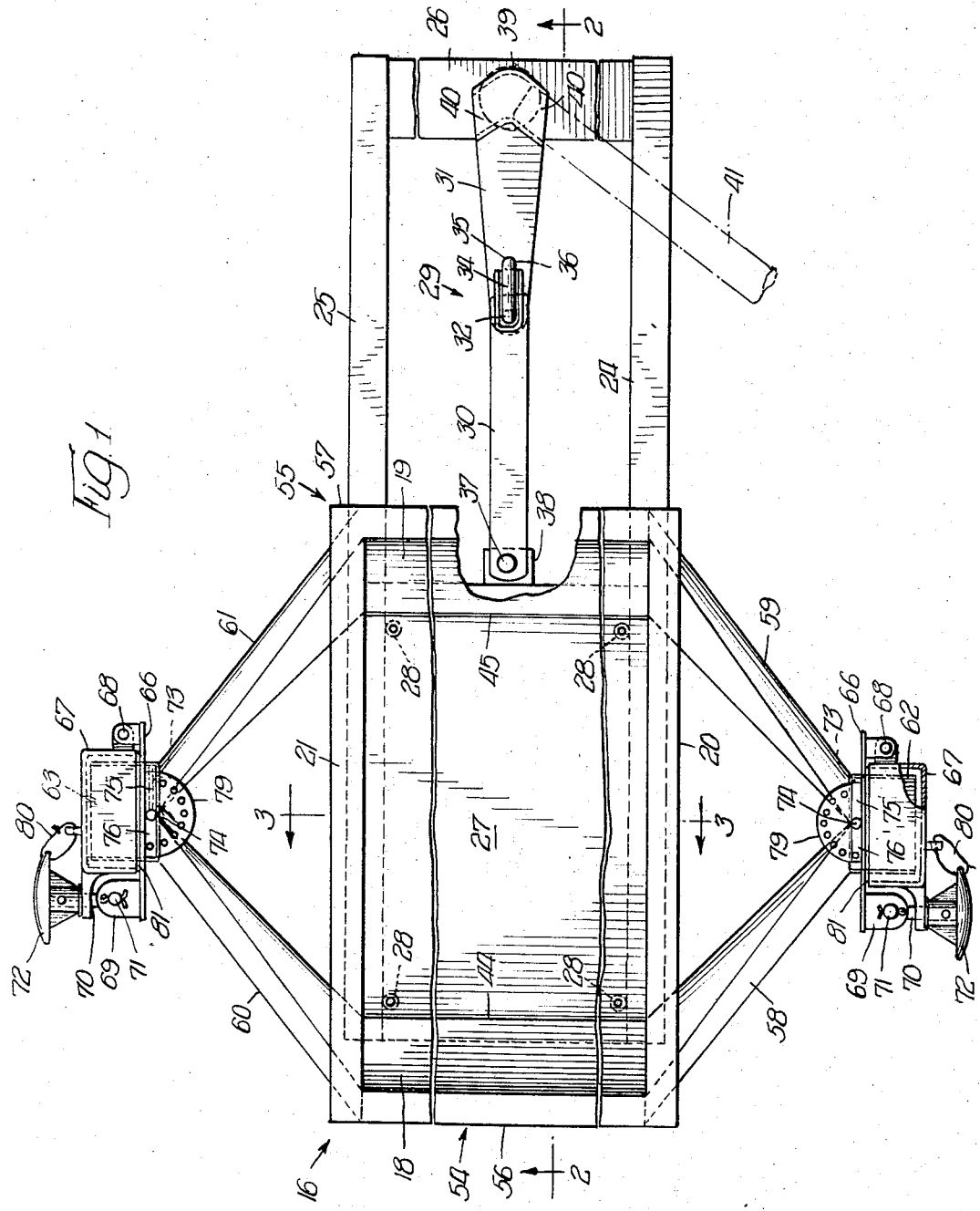

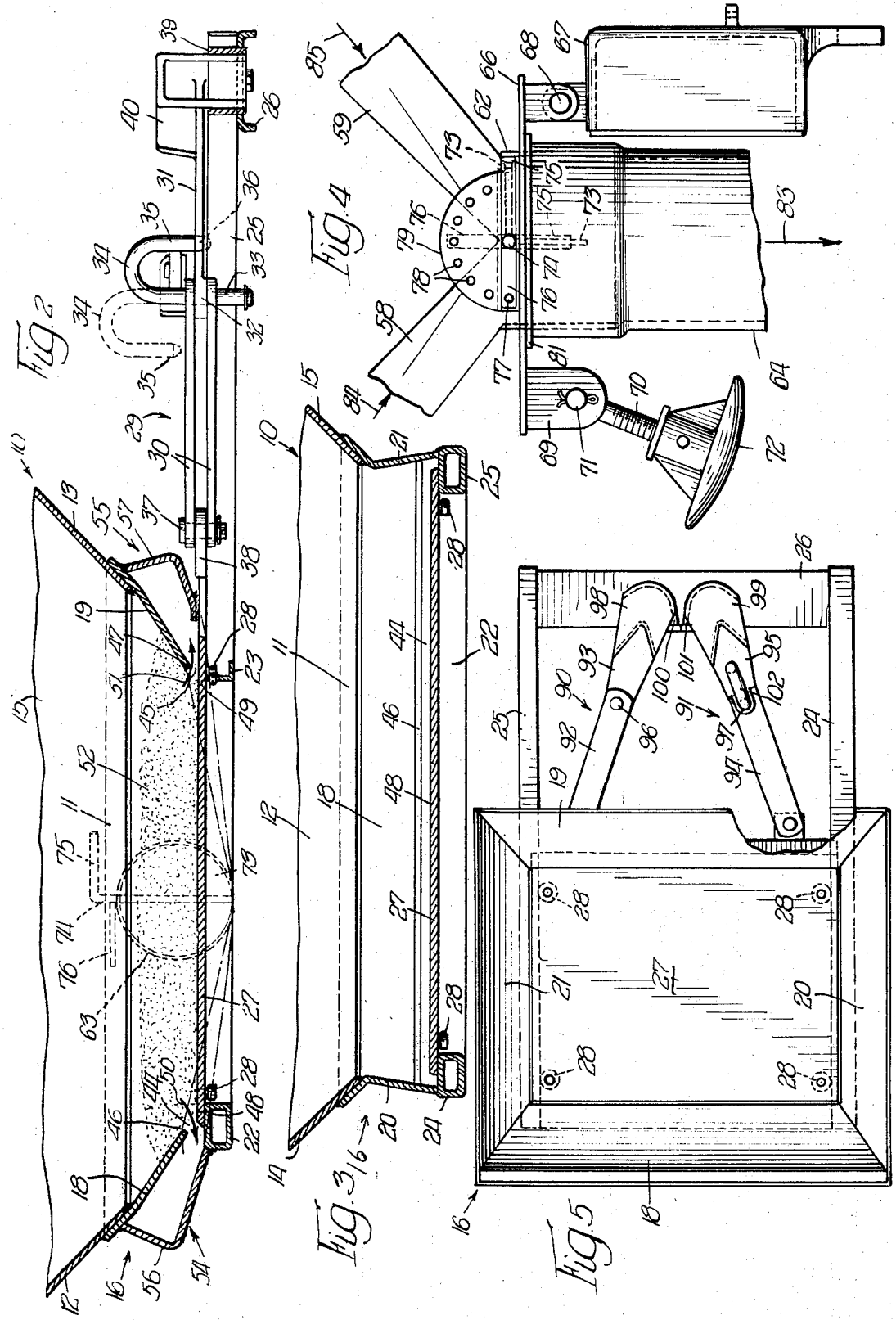

United States Patent Office 3,343,887
Patented Sept. 26, 1967

3,343,887
COMBINATION GRAVITY AND PNEUMATIC HOPPER OUTLET CONSTRUCTION FOR RAILWAY CARS AND THE LIKE
Robert R. McNamara, Western Springs, Ill., assignor to Fabko Engineering Co., Inc., Hinsdale, Ill., a corporation of Illinois
Filed Mar. 2, 1966, Ser. No. 531,116
13 Claims. (Cl. 302—52)

ABSTRACT OF THE DISCLOSURE

Pneumatic and gravity discharge mechanism is provided for hoppers of railway cars and the like. The pneumatic discharge mechanism employs lading receiving conduits opening into opposite sides of the hopper and connected to individual suction conduits which are commonly connected to a damper containing nozzle. The gravity discharge mechanism includes a horizontally slidable gate which, in closed position, defines the lower side of each opening into the lading receiving conduits. A toggle lever assembly reacts between rails, on which the gate is slidable, and the gate to open and close it. Rollers on the gate guide it along the rails and prevent cocking. When two sets of toggle levers are employed, abutment means on links of each pair limit movement in the gate closing direction to the respective center position.

---

This invention relates, generally, to lading outlets for hoppers of railway cars, trucks, and the like and it has particular relation to both gravity and pneumatic hopper outlet constructions.

Among the objects of this invention are: To provide a relatively light weight discharge outlet construction for railway hopper cars and the like in which the lading can be discharged efficiently and with a minimum of residue at the termination of the unloading operation; to provide for pneumatically unloading lading from a hopper with a minimum of obstruction to the flow of the lading on subjecting it to a negative source of pneumatic pressure such as a vacuum created in air or in other gas; to employ a sliding gate for gravity discharge of lading in combination with pneumatic lading discharge means in such manner that the lading is completely discharged from the hopper; to provide a pair of horizontally aligned spaced apart lading receiving openings at the bottom of a hopper and for connecting them individually to suction conduits to which a source of negative pneumatic pressure is commonly applied; to control individually the application of vacuum to the suction conduits and thereby to the lading receiving openings; to provide damper means for effecting this control; to arrange for application of vacuum to opposite ends of lading receiving conduits in which the lading receiving openings are located to permit unloading from either side of the hopper; to employ a nozzle at the juncture of the suction conduits extending from the ends of the lading receiving conduits and to provide a damper at each junction to control the fluid flow through the conduits and lading receiving openings; to mount the gate to slide along horizontally extending rails with rollers on the gate to engage the rails and reduce friction forces therebetween to permit movement of the gate by toggle lever means that applies an unsymmetrical force to move the gate between its open and closed positions; to arrange the gate so that its upper surface defines the lower edge of each of the lading receiving openings; to move the gate by use of a pair of toggle links reacting between the gate and the rails; to employ two sets of independently operable toggle links for moving the gate to permit operation from opposite sides of the hopper; and to provide mutually engageable abutment means on one link of each pair to prevent each pair of links from moving to and beyond the respective center position.

In the drawings: FIG. 1 is a top plan view of a hopper outlet construction embodying this invention. FIG. 2 is a vertical sectional view taken generally along the line 2—2 of FIG. 1, the showing here being at a slightly enlarged scale. FIG. 3 is a vertical sectional view taken generally along the line 3—3 of FIG. 1 and at a slightly enlarged scale. FIG. 4 is a top plan view, at an enlarged scale, of one of the nozzles shown in FIG. 1 and illustrating how a hose of a pneumatic unloading system can be connected thereto. FIG. 5 is a top plan view of a modified hopper outlet construction employing a pair of toggle lever means for moving the gate between its open and closed positions.

In FIGS. 2 and 3 the reference character 10 designates, generally, a four sided hopper which may form a part of a railway car or truck arranged to convey relatively finely divided lading such as various dry chemicals, grain, etc. The hopper 10 has a hopper opening 11 that is arranged to permit flow of lading downwardly therethrough. The hopper opening 11 is defined by metallic inclined hopper end sheets 12 and 13 and metallic inclined hopper side sheets 14 and 15 that are suitably joined together, as by welding, to provide a rectangular configuration. Some of these sheets may extend vertically in accordance with conventional practice.

Surrounding the hopper opening 11 and suitably secured to the hopper 10 is a hopper outlet construction that is indicated, generally, at 16. It comprises a generally rectangular metallic frame that is formed by end frame members 18 and 19 and side frame members 20 and 21. The frame members are suitably joined together, as by welding, and are secured to the end and side sheets of the hopper 10 by welding or other suitable means. FIG. 1 shows a top plan view of the hopper outlet construction 16. It includes a transverse member 22 that may be in the form of a rectangular tube and spaced from it is a transverse angle 23. Side rails 24 and 25 extend from the transverse member 22 with the transverse angle 23 therebetween. The side rails 24 and 25 may be of rectangular tubular construction and are joined at their distal ends by a channel shaped cross member 26.

For closing the hopper opening 11 a gate 27 is provided. It is arranged to slide horizontally along the side rails 24 and 25. Rollers 28 are journaled on the under side of the gate 27 in juxtaposition to the inner side walls of the side rails 24 and 25 for the purpose of guiding the gate 27 therealong in its movement between the closed and the open positions on application of unsymmetrical forces applied for effecting this movement in a manner to be described.

In accordance with this invention the gate 27 is arranged to be moved along the upper surfaces of the side rails 24 and 25 by toggle lever means shown generally at 29 in FIGS. 1 and 2. The toggle lever means 29 includes links 30 and 31 which are pivoted together at 32 on one arm 33 of a U-shaped locking pin 34. The other or short arm 35 of the U-shaped locking pin 34 is arranged to enter an aperture 36 in the link 31 for the purpose of holding the toggle lever means 29 in the center position shown in FIG. 1 whereby the gate 27 is held against movement in the closed position. The link 30, which comprises a pair of link members, is pivoted at the other end by a pin 37 to a tongue 38 which extends centrally from the gate 27. The other end of the link 31 is journaled in a bearing 39. It is carried by the channel shaped cross member 26. Sockets 40 are formed integrally with the link 31 for receiving an operating handle 41, shown by broken lines, from either side for the purpose of rotating the link 31 after the locking pin 34 has been withdrawn to operate the toggle lever means 29 from the center position in either direction for moving the gate 27 between the closed and open positions thereof.

Since only the single toggle lever means 29 is employed for moving the gate 27, the force applied thereto is unsymmetrical with respect to it with the result that the gate 27 tends to be cocked against the side rails 24 and 25. By providing the rollers 28 it is possible to reduce to a minimum the friction incident to such cocking action with the result that the gate 27 can be readily moved. Since the toggle lever means 29 occupies the center position when the gate 27 is fully closed, the application of force by the operating handle 41 acts with minimum advantage to break loose the gate 27 and initiate its movement from the closed position toward the open position. Likewise, the handle 41 is operating at maximum advantage in completing the movement of the gate 27 to the closed position. In the center position of the toggle lever means 29 the gate 27 is securely held in the closed position.

It is desirable to provide, not only for gravity unloading of lading in the hopper 10 by opening the gate 27, but also it is desirable to provide for unloading the lading from the hopper 10 pneumatically where pneumatic conveying apparatus is available. In accordance with this invention horizontal lading receiving openings 44 and 45 are provided in parallel spaced relation along opposite sides of the hopper outlet construction 16. The openings 44 and 45 are located between lower edges 46 and 47 of the end frame members 18 and 19 and the adjacent surface portions 48 and 49 of the gate 27. The lading is arranged to flow in the directions indicated by arrows 50 and 51 from a pile 52 of lading on the gate 27 that is common to the horizontal lading receiving openings 44 and 45.

The horizontal lading receiving openings 44 and 45 are formed in lading receiving conduits 54 and 55 that are located exteriorly of the hopper outlet construction 16. By locating the lading receiving conduits 54 and 55, as disclosed, they do not interfere in any way with the free flow of the lading through the hopper opening 11 when the gate 27 is opened. The lading receiving conduits 54 and 55 are formed, in part by the outer surfaces of the end frame members 18 and 19 and, in part, by trough shaped members 56 and 57 which are welded in position to provide a rigid construction.

As shown more clearly in FIG. 1 suction conduits 58 and 59 are connected to the ends of the lading receiving conduits 54 and 55 on one side of the hopper outlet construction 16 while the other ends of the lading receiving conduits 54 and 55 have suction conduits 60 and 61 connected thereto. The pairs of suction conduits 58–59 and 60–61 open into nozzles 62 and 63 to either of which a suction hose 64, FIG. 4, can be connected. This arrangement makes it possible to apply suction individually to either of the horizontal lading receiving openings 44 or 45. This is of particular importance at the termination of the pneumatic unloading operation in which one or the other of the horizontal lading receiving openings 44 or 45 becomes uncovered with the result that the application of vacuum to the opening that remains covered is reduced or terminated. The manner in which the individual control is effected will be described presently.

The construction at each of the nozzles 62 and 63 is identical. At each there is provided a support plate 66, FIG. 4, on which a closure cap 67 is pivoted at 68. The support plate 66 also carries an ear 69 to which a clamp bolt 70 is pivoted at 71. A hand wheel nut 72 is arranged to cooperate with the closure cap 67 for holding it in the closed position.

For individually controlling the suction applied to the suction conduits 58–59 and 60–61 and thereby to the horizontal lading receiving openings 44 and 45, each nozzle has mounted therein a semi-circular damper 73, FIG. 2. Each damper 73 is mounted for rotation with a vertical shaft 74 that has a handle 75 at the upper end for rotating it. An arm 76 extends laterally from the shaft 74 and is provided with an aperture 77, FIG. 4, for receiving a pin (not shown) that is arranged to engage any one of apertures 78 in a quadrant 79 to hold the damper 73 in any position to which it may be operated.

A conventional sealing strip 80 can be provided, FIG. 1, for interconnecting each of the closure caps 67 and the respective hand wheel nut 72 for the purpose of preventing unauthorized operation. A gasket 81 is interposed between the plate 66 and each closure cap 67 so that a sealed connection is obtained therebetween.

In operation for gravity discharge the U-shaped locking pin 34 is moved upwardly and swung to the position shown by broken lines in FIG. 2. Then an operating handle 41 is inserted in one or the other of the sockets 40 and the link 31 is rotated to break the joint of the toggle lever means 29 and initiate movement of the gate 27 toward the open position. The link 31 is rotated far enough to slide the gate 27 along the side rails 24 and 25 to such position that the left edge, FIG. 2, clears the transverse angle 23. Although the gate 27 tends to be cocked relative to the side rails 24 and 25 as the result of the unsymmetrical application of force by the toggle lever means 29, the rollers 28 reduce to a minimum the friction incident to this action and facilitate movement of the gate 27 to the open position.

In the open position the lading 52 flows freely downwardly without any hindrance because of the presence of the pneumatic discharge mechanism since it is located entirely out of the path of the flow of the lading. After the lading has been discharged completely, the toggle lever means 29 is operated in a reverse direction to move the gate 27 back to the closed position. The locking pin 34 then is replaced.

When the hopper 10 is to be unloaded pneumatically, one or the other of the closure caps 67 is opened by breaking the respective sealing strip 80 and loosening the respective hand wheel nut 72. As shown in FIG. 4 the closure cap 67 has been swung to the open position and the hose 64 has been applied to the nozzle 62. Vacuum or suction then is applied in the direction indicated by arrow 83 with the semi-circular damper 73 in the central position and the handle 75 correspondingly located as shown by broken lines. The vacuum then is applied equally in the directions indicated by arrows 84 and 85 to the suction conduits 58 and 59 and likewise is equally applied to the lading receiving conduits 54 and 55 into which the lading 52 is caused to flow as indicated by arrows 50 and 51 through the horizontal lading receiving openings 44 and 45. If it is desired to change the distribution of the negative pressure between the suction conduits 58 and 59, the semi-circular damper 73 can be correspondingly positioned. In addition, if further adjustment is required, the other closure cap 67 on the nozzle 63 can be opened and the associated semi-circular damper 73 operated to the desired position.

The pneumatic unloading continues until the pile 52 of lading common to both of the horizontal lading receiving openings 44 and 45 is reduced to such a point that one of these openings is exposed. As a result of this exposure the vacuum is lost at the other opening. For example, assuming that the opening 44 at the left end of the gate 27 is uncovered first, then the entire vacuum is transferred to it and lading ceases to flow through the other opening 45. When this occurs, the damper 73 in the nozzle 62 is operated to such a position that the suction conduit 58 is completely closed off. Then the entire vacuum is applied to the suction conduit 59 and thereby to the lading receiving conduit 55. The unloading operation continues until the lading receiving opening 45 is uncovered.

In order to complete the unloading and remove any balance of the pile 52, the locking pin 34 is moved to the unlocked position and the toggle lever means 29 is moved to operate the gate 27 toward the open position. This brings the balance of the pile 52 of lading into juxtaposition with the lading receiving opening 45 and, on movement of the gate 27 to the fully open position, the remainder of the lading is completely removed. Then the gate 27 is reclosed, the hose 64 removed and the closure cap 67 replaced in sealed position.

The final pneumatic unloading steps can be completed by making use of the semi-circular damper 73 associated with the other nozzle 63. Also, it will be understood that the pneumatic unloading can be accomplished by applying the hose 64 to the other nozzle 63 and advantage taken of the particular construction for insuring that the lading is completely withdrawn.

FIG. 5 shows a modified form of toggle lever means that can be employed for operating the gate 27 in conjunction with the hopper outlet construction 16 shown in FIGS. 1, 2 and 3. Here a pair of toggle lever means 90 and 91 are employed and are arranged to react between the channel shaped cross member 26 and the gate 27 in generally the same manner that the toggle lever means 29 function. The toggle lever means 90 comprises links 92 and 93 while the toggle lever means 91 comprises links 94 and 95. They are pivoted at 96 and 97 respectively and sockets 98 and 99 are provided for receiving the operating handle 41. One or the other of the sockets 98 or 99 is employed, depending upon the side of the hopper outlet construction 16 from which it is desired to open the gate 27. When the operating handle 41 is inserted in one or the other of the sockets 98 or 99, the gate 27 is moved toward the open or closed position, depending upon the direction of rotation. The gate 27 is then moved through the agency of the toggle lever means 90 or 91 to which the operating force is applied. The other toggle lever means merely idles since the links 93 and 95 are not mechanically interconnected other than through the gate 27.

It is important that provision be made for preventing the toggle lever means 90 and 91 from being moved past the center position. For this purpose abutment means 100 and 101 are provided on the sockets 98 and 99 and they are arranged to have mutual engagement such that the toggle lever means 90 and 91 cannot be moved beyond the center position and preferably the arrangement is such that they only approach the respective center position.

Because of the provision of the rollers 28, the cocking of the gate 27 that is incident to the unsymmetrical application of forces by the one or the other of the toggle lever means 90 or 91 is accommodated.

A locking pin 102, similar to the locking pin 34, is associated with the toggle lever means 91 for locking the gate 27 in the fully closed position.

What is claimed as new is:

1. For combination with a railway car or the like having a hopper for discharging lading downwardly, pneumatic hopper discharge means comprising:
   means providing a pair of horizontally aligned spaced apart lading receiving openings the lower side of each of which is defined by upwardly facing wall means and to each of which lading from a common pile is adapted to flow,
   a suction conduit individual to each opening and having imperforate side walls, and
   means commonly interconnecting said suction conduits and adapted to be connected to a negative source of pneumatic pressure whereby suction can be applied individually to each lading receiving opening independently of the other lading receiving opening.

2. The pneumatic hopper discharge means claimed in claim 1 characterized in that the upwardly facing wall means is common to both lading receiving openings.

3. The pneumatic hopper discharge means claimed in claim 1 characterized in that:
   the lading receiving openings are provided in lading receiving conduits adapted to extend horizontally underneath the lading,
   the upwardly facing wall means is formed by a floor underlying said conduits, and
   said lading receiving conduits having imperforate side walls communicate directly with the suction conduits.

4. For combination with a railway car or the like having a hopper for discharging lading downwardly through a hopper opening, combined gravity and pneumatic discharge means comprising:
   generally rectangular frame means for surrounding said hopper opening and defining a gravity discharge opening,
   a horizontally slidable gate on said frame means for closing said discharge opening,
   lading receiving conduits along opposite sides of said frame means and transversely of said door,
   each lading receiving conduit communicating with the space bounded by said frame means through a horizontal lading receiving opening the lower side of which is defined by said gate in closed position,
   a suction conduit individual to each lading receiving conduit and having imperforate side walls, and
   a nozzle commonly interconnecting said suction conduits and adapted to be connected to a negative source of pneumatic pressure.

5. The combined gravity and pneumatic discharge means as claimed in claim 4 characterized in that:
   rails depend from the frame means on which the gate is slidably mounted, and
   gate operating means react between said rails and said gate for opening and closing the same.

6. The combined gravity and pneumatic discharge means as claimed in claim 5 characterized in that the gate operating means includes toggle lever means adapted to be moved in the plane of said gate from a toggle center position in initiating movement of the gate from its fully closed position toward its open position.

7. The combined gravity and pneumatic discharge means as claimed in claim 6 characterized in that:
   the toggle lever means includes a pair of links pivoted together at one end with one link pivoted at its other end to the gate and the other link pivoted at its other end to a transverse member secured to the rails, and
   roller means on said gate are juxtaposed to the rails to guide said gate along said rails on movement of said gate by said toggle lever means.

8. For combination with a railway car or the like having a hopper for discharging lading downwardly, pneumatic hopper means comprising:
   a pair of horizontally aligned spaced apart lading receiving conduits underneath said lading, each conduit having a horizontally extending lading receiving opening the lower side of which is defined by a floor underlying said conduits and to each of which conduits lading from a common pile on said floor is adapted to flow,
   a suction conduit individual to and communicating directly with each end of each lading receiving conduit,
   a nozzle providing a common connection to each pair of suction conduits, and
   a damper for each nozzle for controlling communication between it and the respective pair of suction conduits.

9. For combination with a railway car or the like having a hopper for discharging lading downwardly through a hopper opening, combined gravity and pneumatic discharge means comprising:
   generally rectangular frame means for surrounding said hopper opening and defining a gravity discharge opening,
   a horizontally slidable gate on said frame means for closing said discharge opening, lading receiving conduits along opposite sides of said frame means and transversely of said door, each lading receiving conduit communicating with the space bounded by said frame means through a horizontal lading receiving opening the lower side of which is defined by said gate in closed position, a suction conduit individual to each end of each lading receiving conduit, a nozzle commonly interconnecting each pair of suction conduits and adapted to be connected to a negative source of pneumatic pressure, and a damper for each nozzle for controlling communication between it and the respective pair of suction conduits.

10. For combination with a railway car or the like having a hopper for discharging lading downwardly through a hopper opening, combined gravity and pneumatic discharge means comprising:

generally rectangular frame means for surrounding said hopper opening and defining a gravity discharge opening, a horizontally slidable gate on said frame means for closing said discharge opening, lading receiving conduits along opposite sides of said frame means and transversely of said door, each lading receiving conduit being formed, in part, by the side of said frame means associated therewith and, in part, by an outstanding trough shaped member, each lading receiving conduit communicating with the space bounded by said frame means through a horizontal lading receiving opening the lower side of which is defined by said gate in closed position, a suction conduit individual to each end of each lading receiving conduit, and a nozzle commonly interconnecting each pair of suction conduits and adapted to be connected to a negative source of pneumatic pressure.

11. For combination with a railway car or the like having a hopper for discharging lading downwardly through a hopper opening, combined gravity and pneumatic discharge means comprising:

generally rectangular frame means for surrounding said hopper opening and defining a gravity discharge opening, horizontally extending rails depending from said frame means, a gate slidable on said rails for closing said discharge opening, gate operating means reacting between said rails and said gate for opening and closing the same including toggle lever means adapted to be moved from a toggle center position in initiating movement of said gate from its fully closed position toward its open position, said toggle lever means including a first pair of links pivoted together at one end with one link pivoted at its other end to said gate and the other link pivoted at its other end to a transverse member secured to said rails, roller means on said gate juxtaposed to said rails to guide said gate along said rails on movement of said gate by said toggle lever means, said toggle lever means including a second pair of links operable independently of said first pair of toggle links, abutment means on the other links of each pair mutually engageable in the closed position of said door to prevent each pair of toggle links from moving beyond the respective center position on closing said door by operation of either pair of toggle links, lading receiving conduits along opposite sides of said frame means and transversely of said door, each lading receiving conduit communicating with the space bounded by said frame means through a horizontal lading receiving opening the lower side of which is defined by said gate in closed position, a suction conduit individual to each lading receiving conduit, and a nozzle commonly interconnecting said suction conduits and adapted to be connected to a negative source of pneumatic pressure.

12. For combination with a railway car or the like having a hopper for discharging lading downwardly through a hopper opening, gravity discharge means comprising:

generally rectangular frame means for surrounding said hopper opening and defining a gravity discharge opening, a horizontally slidable gate on said frame means for closing said discharge opening, rails carried by said frame means on which said gate is slidable, rollers on said gate juxtaposed to said rails to guide said gate therealong, toggle lever means reacting between said rails and said gate and adapted to be moved from a toggle center position in initiating movement of said gate from its fully closed position toward its open position, said toggle lever means including a first pair of links pivoted together at one end with one link pivoted at its other end to said gate and the other link pivoted at its other end to a transverse member secured to said rails, said toggle lever means including a second pair of links operable independently of said first pair of toggle links, and abutment means on the other links of each pair mutually engageable in the closed position of said door to prevent each pair of toggle links from moving beyond the respective center position on closing said door by operation of either pair of toggle links.

13. The combined gravity and pneumatic discharge means as claimed in claim 10 characterized in that a damper at the juncture of the suction conduits and nozzle controls the communication therebetween.

References Cited

UNITED STATES PATENTS

| | | | |
|---|---|---|---|
| 2,919,158 | 12/1959 | Aller | 302—52 |
| 3,020,093 | 2/1962 | Dorey | 302—52 |
| 3,145,664 | 8/1964 | Dorey | 105—253 |

EVON C. BLUNK, *Primary Examiner.*

H. C. HORNSBY, *Assistant Examiner.*